(12) United States Patent
Van Kesteren et al.

(10) Patent No.: US 6,317,302 B1
(45) Date of Patent: Nov. 13, 2001

(54) THIN-FILM MAGNETIC READ HEAD WITH LOCALLY REDUCED EXCHANGE COUPLING

(75) Inventors: Hans W. Van Kesteren; Derk J. Adelerhof; Reinder Coehoorn, all of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/365,464

(22) Filed: Aug. 2, 1999

(30) Foreign Application Priority Data

Jul. 31, 1998 (EP) .................................................. 98202584

(51) Int. Cl.$^7$ ....................................................... G11B 5/00
(52) U.S. Cl. ................. 360/327.32; 360/327; 360/324.1; 360/316
(58) Field of Search ............. 360/327.32, 324.1–324.12, 360/316, 327, 325

(56) References Cited

U.S. PATENT DOCUMENTS

| | | | |
|---|---|---|---|
| 4,785,366 | * 11/1988 | Krounbi et al. | ...................... 360/113 |
| 5,668,687 | * 9/1997 | Chen et al. | ........................... 360/113 |

FOREIGN PATENT DOCUMENTS

9736289A1 10/1997 (WO) .

OTHER PUBLICATIONS

"Flux–Guided MR Head for Very Low Flying Height", by T. Koshikawa et al., IEEE Transactions on Magnetics, vol. 30, No. 6, Nov. 1994, pp. 3840–3842.

"Conductance and Exchange coupling of Two Ferromagnets Separated by a Tunneling Barrier", J.C. Slonczewski, Physical Review B, vol. 39, No. 10, Apr. 1989, pp. 6995–7002.

"Low Field Magnetoresistance in Magnetic Tunnel Junctions prepared by Contact Masks and Lithography: 25% Magnetoresistance at 295 K in mega–Ohm Micro–Sized Junctions", S.S.P. Parkin et al., J. Appl. Phys. vol. 81, No. 8, Apr. 15, 1997, p. 5521.

\* cited by examiner

Primary Examiner—Jefferson Evans
(74) Attorney, Agent, or Firm—David R. Treacy

(57) ABSTRACT

A thin-film magnetic read head device comprises an end face extending in a first direction, in which a magnetic information carrier is movable with respect to the magnetic head device, and in a second direction, perpendicular to said first direction. The magnetic head device further comprises a multilayer structure with at least two soft-magnetic layers separated by a magnetic insulation layer and with at least one exchange biasing layer, which multilayer structure extends in the second direction and in a third direction, perpendicular to the first and the second direction, and forms at least one flux path in the first and the third direction. The exchange coupling between one of the soft-magnetic layers and the exchange biasing layer is at least partly reduced locally, i.e. interrupted or at least substantially reduced, in at least the second direction, while the exchange biasing layer extends uninterruptedly in the region of said reductions.

19 Claims, 4 Drawing Sheets

THIN-FILM MAGNETIC READ HEAD WITH LOCALLY REDUCED EXCHANGE COUPLING

BACKGROUND OF THE INVENTION

The present invention relates to a thin-film magnetic read head device comprising an end face extending in a first direction, in which a magnetic information carrier is movable with respect to the magnetic head device, and in a second direction, perpendicular to said first direction, the magnetic head device further comprising a multilayer structure with at least two soft-magnetic layers separated by a magnetic insulation layer and with at least one exchange biasing layer cooperating with one of said soft-magnetic layers, which multilayer structure extends in the second direction and in a third direction, perpendicular to the first and the second direction, and forms at least one flux path in the first and the third direction.

Such a thin-film magnetic read head device is known from Koshkawa et al, Flux-Guided MR Head for Very Low Flying Height, IEEE Trans. Magn. 30 (1994), pp. 3840–3842. In this article, particularly on page 3840 and FIG. 2, a shielded read head is described and illustrated with an interrupted wing-like exchange biasing layer, the interruption determining the read width. The wing-like embodiment of the exchange biasing layer is applied for stabilizing a magnetoresistive element by boundary control stabilization and for determining the read width. As a consequence of the structuring, i.e. the interruption, of the exchange biasing layer, this magnetic read head device is not appropriate to realize read widths below about 1 μm.

In former yoke-type magnetic read heads, the dimension in the second direction of the flux guide in front of a magnetoresistive element usually determined the read width. A multichannel magnetic read head device was obtained by an arrangement in the second direction of flux guides and magnetoresistive elements cooperating therewith. However, for read widths below about 20 μm, multidomain states were likely to occur in the front flux guide, resulting in Barkhausen noise. Therefore an improvement was proposed in EP application No. 96203031.8.

In order to obtain a multichannel magnetic read head device, this document describes a number of flux-guiding elements and a number of magnetoresistive elements, cooperating with said flux-guiding elements, which elements form a number of parallel flux paths in the first and the third direction, the number corresponding to the number of magnetic channels of the magnetic read head device. A channel separation, i.e. a separation of the parallel flux paths, is obtained by a magnetically anisotropic structure, the magnetic permeability thereof in the second direction being small in comparison with the magnetic permeability in the third direction.

By application of the embodiments, described in EP application No. 96203031.8, the read widths are controlled by the anisotropy in combination with the distance between the contacts on the magnetoresistive elements. This method allows use of front flux guides with a width larger than the read width and thereby retains a single domain configuration also for smaller track widths. This is a viable method for track widths down to about 5 μm. For track widths of a few microns and less, this method appears to be no longer sufficient due to limitations in the soft-magnetic material properties.

In shielded magnetic read heads with the magnetoresistive elements extending to the head surface, the read width was determined by the spacing between the contacts on the magnetoresistive element or, in the case of a multichannel head, magnetoresistive elements. By careful structuring of the metallization layer and the biasing layers in the shielded heads read widths down to about 1 μm could be obtained. However, structuring methods based on optical lithography will probably not have a sufficient accuracy for read widths below this value.

SUMMARY OF THE INVENTION

It is an object of the invention to provide a thin-film magnetic read head device, in which a track width below about 1 μm will be possible.

Therefore, in accordance with the invention, there is provided a thin-film magnetic read head device as described in the opening paragraph, which is characterized in that the exchange coupling between one of the soft-magnetic layers and the exchange biasing layer is at least partly reduced locally in at least the second direction, and in that the exchange biasing layer extends uninterruptedly in the region of said local reductions. This device achieves the object defined.

In the following, the expression "reduced" means "interrupted or at least substantially reduced", while the expression "reduction" means "interruption of or at least substantial reduction". A locally reduced exchange coupling between one of the soft-magnetic layers and the exchange biasing layer may be important to control the read width as well as the flux-guiding efficiency. Although in known magnetoresistive elements, like giant magnetoresistive elements or spin tunnel junction type magnetoresistive elements, a type of exchange biasing layers may be provided to pin the direction of magnetization in an adjacent magnetic layer, an exchange biasing layer of such a type is excluded from the term exchange biasing layer in the sense of the present invention in which the coupling between the exchange biasing layer and the adjacent soft-magnetic layer is locally reduced to control the read width or to improve the flux-guiding efficiency.

The present invention can be applied in shielded type magnetic heads as well as in yoke-type magnetic read heads. In both cases, a small-sized read width for a magnetic read head device will be obtained by applying the idea of local reduction of the coupling between an uninterrupted exchange biasing layer and a soft-magnetic layer.

The exchange biasing layer may not only be provided on one of the soft-magnetic layers, but may also be constituted by or be part of the magnetic insulation layer. In a configuration with two exchange biasing layers, both situations may occur.

The reduction can be achieved by the introduction of a specific interface layer structure, particularly only a few monolayers, of non-magnetic material between the exchange biasing layer and the soft-magnetic layer. In accordance with said specific structure, the thickness and/or the composition or microstructure of the interface layer between the exchange biasing layer and the soft-magnetic adjacent layer is locally modified, e.g. by in situ focused ion beam etching or implantation.

For converting the read information into an electric signal, there is provided at least one magnetoresistive element which may comprise at least one of said soft-magnetic layers and said exchange biasing layer, the exchange biasing between these layers at least being partly reduced locally to control the read width. The at least one magnetoresistive element may also be magnetically coupled with or comprise the soft-magnetic layer which is locally coupled with the exchange biasing layer to control the read width. In the latter case, the soft-magnetic layer to which the magnetoresistive element is magnetically coupled may be interrupted in the third direction, while the exchange coupling of the part of said interrupted soft-magnetic layer which is most near the end face and the exchange biasing layer is locally reduced to control the read width. In that case, an exchange biasing layer may be provided between the magnetoresistive element and the soft-magnetic layer to which the magnetoresistive element is coupled, with the exchange biasing being decoupled in the contact region of the magnetoresistive element with the latter exchange biasing layer to control the flux-guiding to said magnetoresistive element.

The magnetoresistive element may be of an anisotropic (AMR), a giant (GMR) or a spin tunnel junction (STJ-MR) type.

In a particular embodiment, the magnetic read head device is a multichannel magnetic head device with the soft-magnetic layers and a number of magnetoresistive elements forming a corresponding number of parallel flux paths in the first and the third direction, this number corresponding to the number of magnetic channels of the magnetic head device.

The invention not only relates to a thin-film magnetic head device as indicated above, but also relates to a system for recording and/or reproducing information, comprising such a thin-film magnetic head device.

BRIEF DESCRIPTION OF THE DRAWINGS

In the following description with reference to the drawings, a simple embodiment of a single-channel shielded read head with an exchange biased AMR element and a more advanced embodiment of a multichannel STJ-MR read head with an exchange biased flux guide will be described.

DESCRIPTION OF THE PREFERRED EMBODIMENTS

Figure 1A:
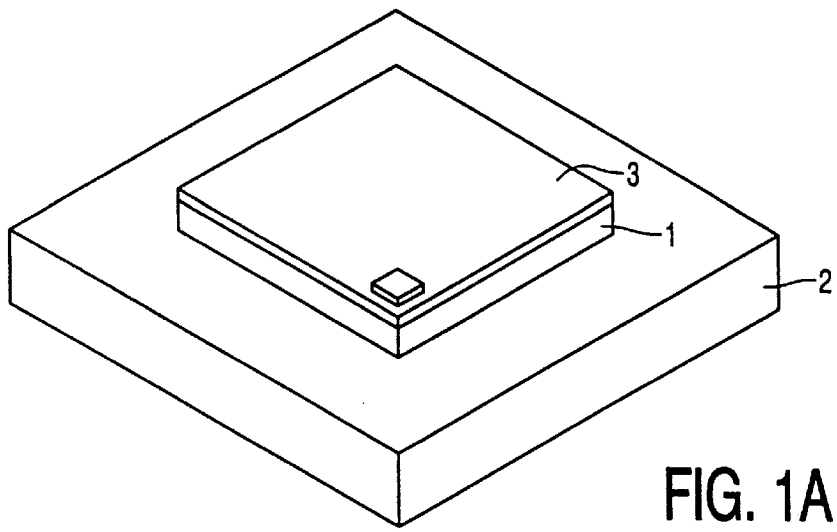
FIGS. 1a–1e illustrate the construction of a single-channel shielded read head according to the invention in successive phases, while in FIGS. 2a–2f the construction of a multichannel STJ-MR yoke-type read head according tot the invention in successive phases is shown.
Figure 1B:
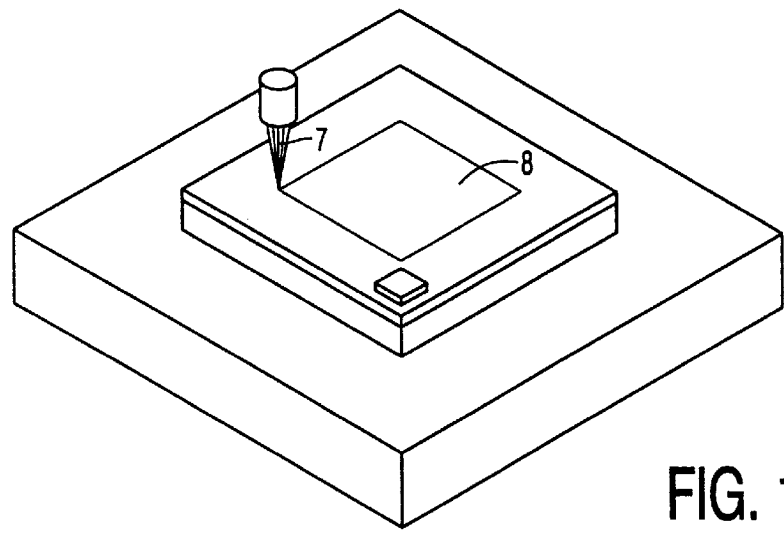
Figure 1C:
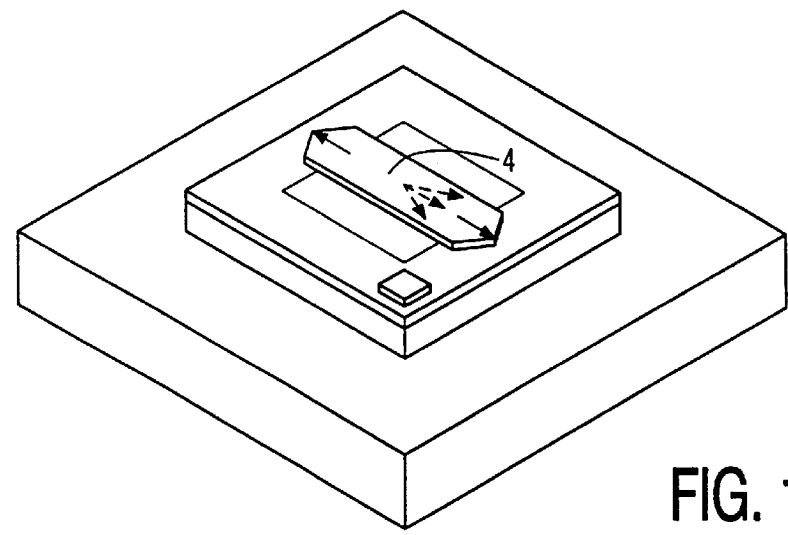
Figure 1D:
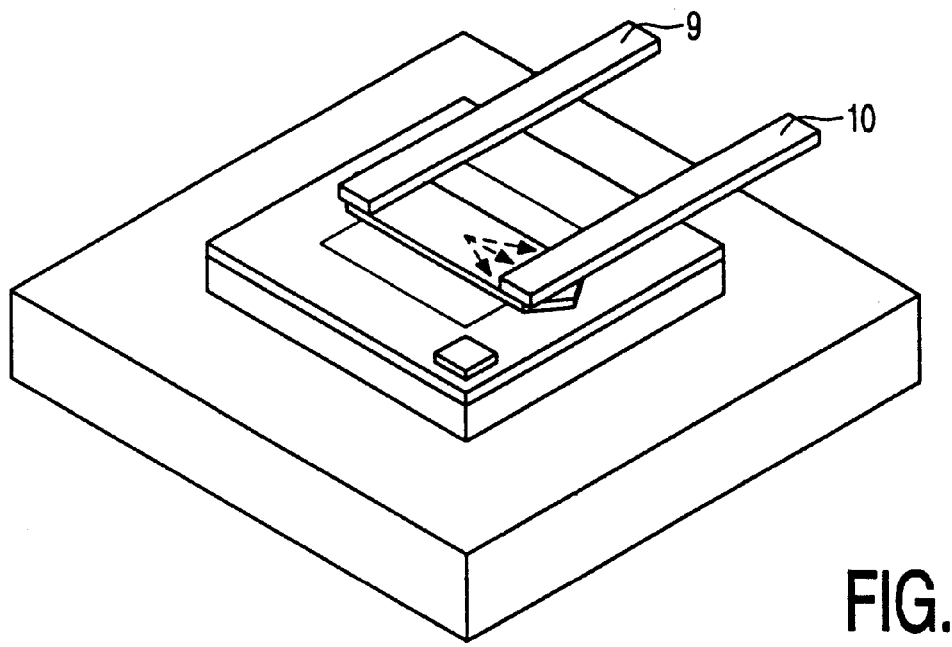

In FIGS. 1a–1e, the construction of a shielded read head is shown. This read head incorporates successively a first flux-guiding element in the form of a lower shield layer 1 on a substrate 2, a first gap layer 3, a magnetoresistive element in the form of a soft adjacent layer magnetoresistive (SAL-MR) structure 4, a second gap layer 5 and a second flux-guiding element in the form of an upper shield 6. An exchange biasing layer is part of the lower gap layer 3 or forms this gap layer. Particularly when the exchange biasing material is used with an anisotropic magnetoresistive (AMR) or a giant magnetorisistive (GMR) element, it may be constituted by an electrically non-conductive (antiferromagnetic) exchange biasing material like NiO.

After deposition of the exchange biasing layer and before deposition of the SAL-MR layer structure, the surface is locally modified by focused ion beam implantation (indicated by 7) with e.g. Ga to define the read area 8. The SAL-MR multilayer consists of a sensing Ni—Fe alloy layer, a Ta(N) interlayer and an Ni—Fe—X (with X=Rh, Nb, etc.)soft adjacent transverse biasing alloy layer. The Ni—Fe layer is exchange-coupled (magnetically pinned) to the exchange biasing layer outside the reading area 8. Contacts 9 and 10 are provided between the SAL-MR layer structure outside the reading area and the gap layer 5. The location of the contacts on the SAL-MR layer structure will not influence the read width as long as they are in the area where the magnetization is fixed, i.e. outside the reading area. However, a location not too far from the sensing region, i.e. the reading area, will be preferred for an optimal response. The voltage across the contact leads 9 and 10 represents the read magnetic information from an information carrier moved along this shielded magnetic head device.

Besides controlling the read width, the exchange biasing layer stabilizes the SAL-MR layer structure also in the longitudinal direction.

Figure 1E:
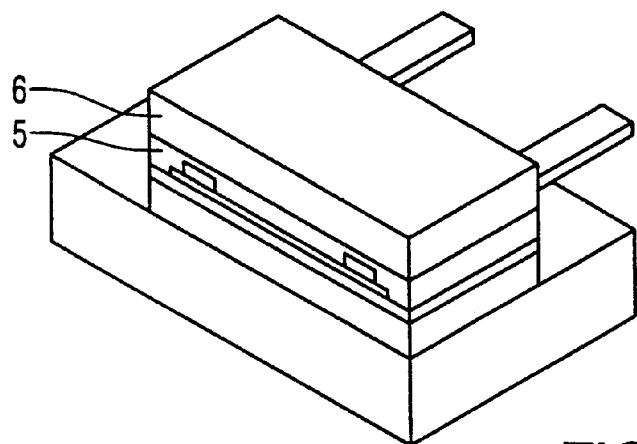

After the deposition of the respective layers, the shielded AMR head is polished, as indicated in FIG. 1e. The read width of the obtained head is determined by the dimension in the second direction of the read area 8.

In FIGS. 2a–2f, the construction of a multichannel STJ yoke-type read head is shown. This read head incorporates successively a first flux-guiding layer 11 on a substrate 12 and an exchange biasing layer in the form of an antiferromagnetic (AF) layer 13. A thin dielectric or metal decoupling layer can be introduced between these layers. If the flux-guiding layer 11 is about several microns thick, a decoupling layer is optional because the flux-guiding layer will still have a sufficiently high permeability.

Figure 2A:
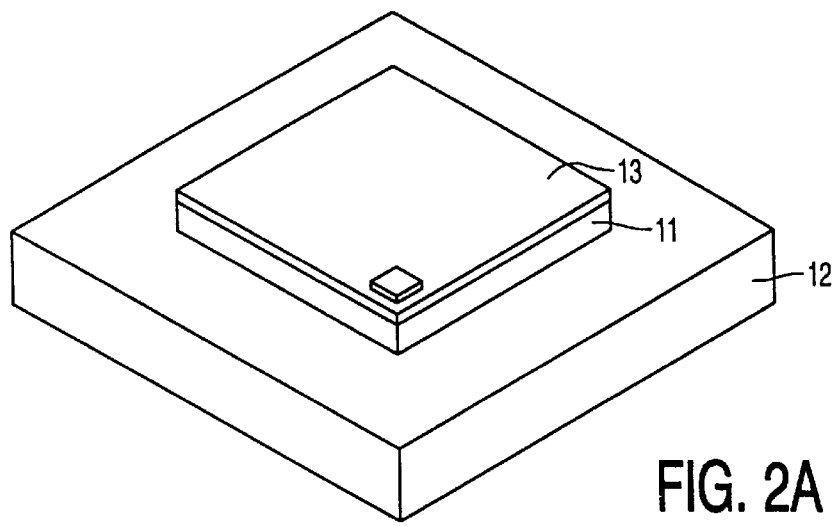
Figure 2B:
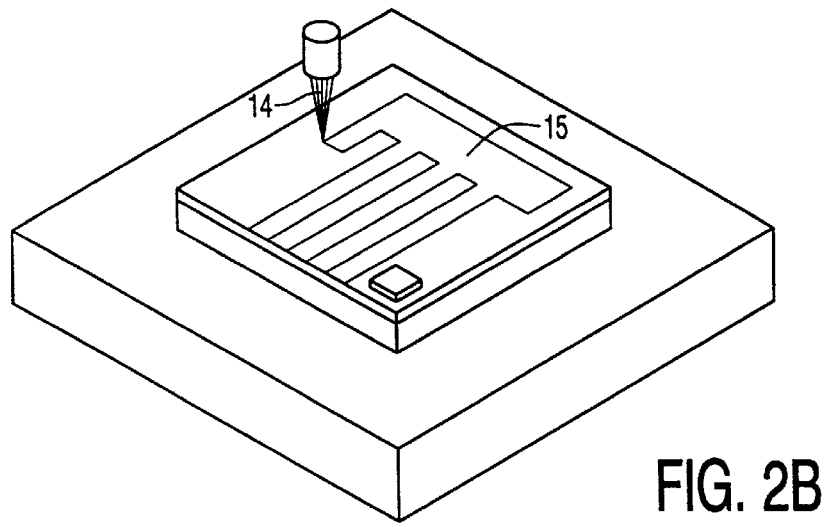
Figure 2C:
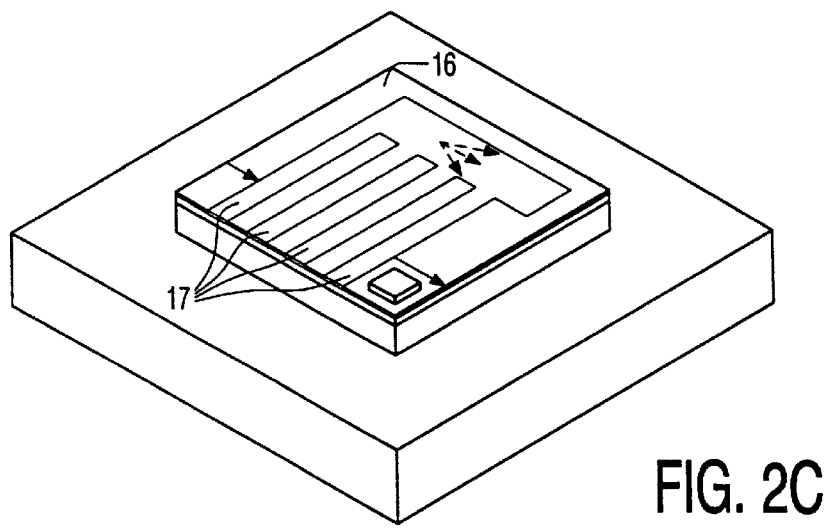
Figure 2D:
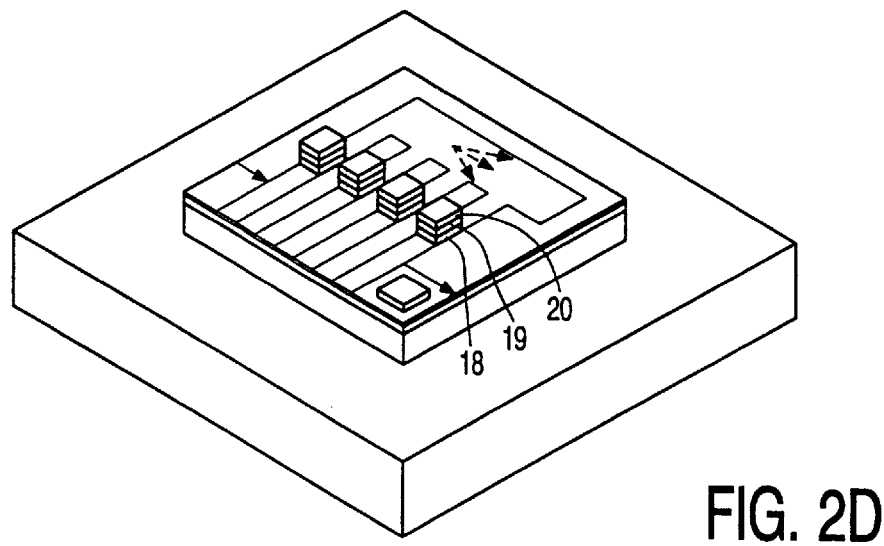
Figure 2E:
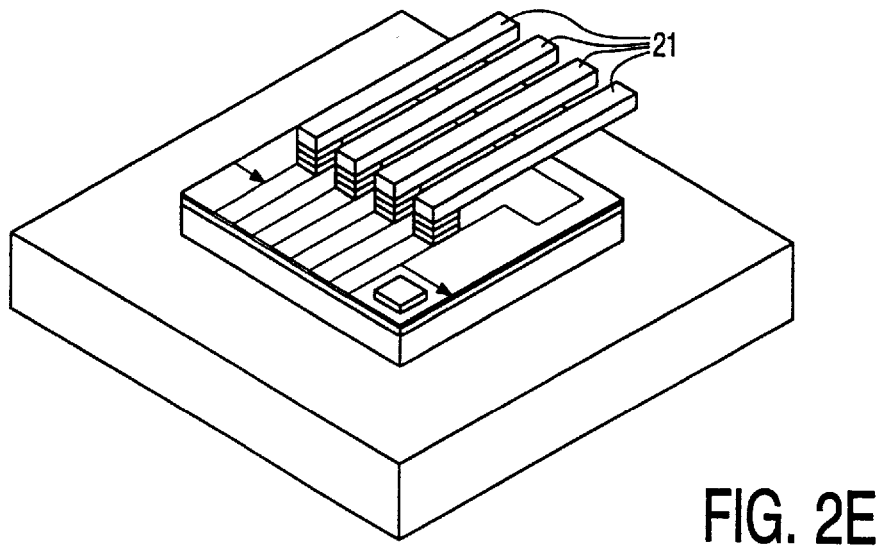
Figure 2F:
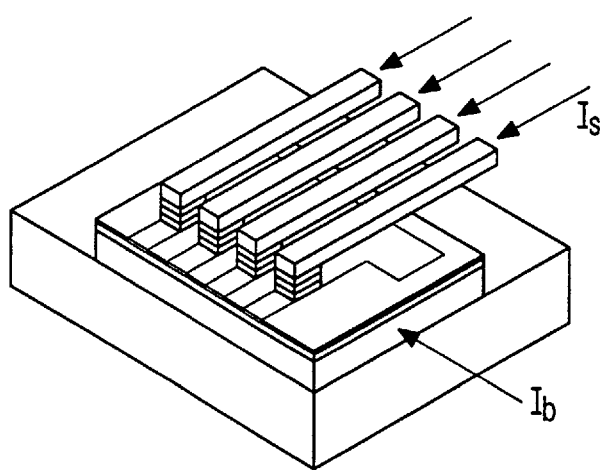

To define the flux-guiding regions in the read head, the exchange biasing layer 13 is in situ implanted with Ga ions by means of focused ion beam implantation (see 14). The implanted surface is indicated by 15. Thereafter (FIG. 2c), an upper flux guide layer 16 is formed, the exchange coupled (magnetically pinned) regions forming separations between parallel flux-guiding paths 17. On these flux-guiding paths, STJ structures are formed as illustrated in FIG. 2d. Each of these structures comprises successively a tunnel barrier layer 18, a pinned STJ layer 19 and a second exchange biasing layer 20. Subsequently, the layers 18–20 are provided and the total stack must be structured by an etching process which stops on the tunnel barrier. By this etching process, the individual channels are definitively obtained. The upper flux guide layer 16 with the layers 18–20 jointly constitute an STJ-MR element at the top of which contact leads 21 are provided.

The principles of Spin Tunnel Junctions (STJs) are discussed in detail in an article by J. C. Slonczewski in Phys. Rev. B 39 (1989), pp. 6995–7002, and a study of the properties of a particular STJ is presented in an article by S. S. P. Parkin et al. in J. Appl. Phys. 81 (1997), p. 5521. In the STJ-MR, the electrical resistance in the vertical direction thereof is dependent on the relative orientation of the magnetization vectors in the decoupled parts of the upper flux layer 16 and the pinned STJ layer 19. A sensing current applied to the contact leads 21 results in voltage values which are indicative of the detected magnetic flux by the read head. The read width and the accuracy of the read channels are determined by the focused ion beam implantation resulting in the required channel separation.

The exchange biasing layer controls the read width but also serves as (part of) the read gap. A bias current can be applied through the lower flux-guide layer to control the direction of magnetization in the free layer 16 of the STJ. The free layer 16 of the STJ also serves as a flux guide. The thickness of the free STJ layer annex flux guide 16 should be sufficiently thin to allow a good exchange pinning and sufficiently thick to allow flux transport to the STJ region without significant flux crossing to the lower flux layer 11. This means that the thickness should be in the range of 0,1–5 $\mu$m for the lower flux layer 11 and 0,01–1 $\mu$m for the upper flux guide 16.

It may further be noticed that, by deposition of an extra shield on top, a shielded version of this flux-guided STJ-MR head can be made. Sawing of the wafer and head lapping (FIG. 2f) completes the head.

A flux-guided STJ-MR head has the advantage that the junction area is not exposed at the head surface and no shorting across the thin tunnel barrier can occur during contact with the recording medium. Furthermore, the dimensions of the STJ area are less critical because the read width is controlled by the exchange coupling.

The invention is not limited to the described embodiments but relates to all types of magnetic read heads based on exchange coupling controlled read widths; they may be applied for very high density hard disc recording as well as for advanced tape recording systems.

What is claimed is:

1. A thin-film magnetic read head device comprising an end face extending in a first direction, in which a magnetic information carrier is movable with respect to the magnetic head device, and in a second direction, perpendicular to said first direction, the magnetic head device further comprising a multilayer structure with at least two soft-magnetic layers separated by a magnetic insulation layer and with at least one exchange biasing layer cooperating with one of said soft-magnetic layers, which multilayer structure extends in the second direction and in a third direction, perpendicular to the first and the second directions, and forms at least one flux path in the first and the third directions, characterized in that the exchange coupling between one of the soft-magnetic layers and the exchange biasing layer is at least partly reduced locally in at least the second direction, and in that the exchange biasing layer extends uninterruptedly in the region of said local reductions.

2. A thin-film magnetic read head device as claimed in to claim 1, characterized in that the exchange biasing layer is constituted by or forms part of the magnetic insulation layer.

3. A thin-film magnetic read head device as claimed in claim 1, characterized in that an interface layer of a non-magnetic material with a specific structure to control the read width is provided between the exchange biasing layer and a respective soft-magnetic adjacent layer.

4. A thin-film magnetic read head device as claimed in claim 1, characterized in that there is provided at least one magnetoresistive element comprising at least one of said soft-magnetic layers and said exchange biasing layer, the exchange biasing between these layers at least being partly reduced locally to control the read width.

5. A thin-film magnetic read head device as claimed in any one of claim 1, characterized in that there is provided at least one magnetoresistive element which is magnetically coupled with or comprises the soft-magnetic layer which is locally coupled with the exchange biasing layer to control the read width.

6. A thin-film magnetic read head device as claimed in claim 5, characterized in that the soft-magnetic layer to which the magnetoresistive element is magnetically coupled is interrupted in the third direction, and in that the exchange coupling of a part of said interrupted soft-magnetic layer which is most near the end face and the exchange biasing layer is locally reduced to control the read width.

7. A thin-film magnetic read head device as claimed in claim 6, characterized in that an exchange biasing layer is provided between the magnetoresistive element and the soft-magnetic layer to which the magnetoresistive element is coupled, with the exchange biasing being decoupled in the contact region of the magnetoresistive element with the latter exchange biasing layer to control the flux-guiding to said magnetoresistive element.

8. A thin-film magnetic read head device as claimed in claim 5, characterized in that the magnetoresistive element is of an anisotropic (AMR), a giant (GMR) or a spin tunnel junction (STJ-MR) type.

9. A system for recording information, comprising a thin-film magnetic read head device as claimed in claim 1.

10. A thin-film magnetic read head device having an end face extending in a first direction, in which a magnetic information carrier is movable with respect to the magnetic head device, and in a second direction, perpendicular to said first direction, wherein the magnetic head device comprises a multilayer structure with at least two soft-magnetic layers separated by a magnetic insulation layer and with at least one exchange biasing layer cooperating with one of said soft-magnetic layers, which multilayer structure extends in the second direction and in a third direction, perpendicular to the first and the second directions, and forms at least one flux path in the first and the third direction, characterized in that the device further comprises an interface layer of a non-magnetic material with a specific structure to control the read width, disposed adjacent one of said soft-magnetic layers, between the exchange biasing layer and said one of said soft-magnetic layers, the exchange coupling between said one of the soft-magnetic layers and the exchange biasing layer is at least partly reduced locally in at least the second direction, the exchange biasing layer extends uninterruptedly in the region of the local reductions, and in accordance with said specific structure, the thickness and/or the composition or microstructure of the interface layer between the exchange biasing layer and the soft-magnetic adjacent layer is locally modified by in situ focused ion beam etching or implantation.

11. A thin-film magnetic read head device as claimed in claim 10, characterized in that the exchange biasing layer is constituted by or forms part of the magnetic insulation layer.

12. A thin-film magnetic read head device as claimed in claim 10, characterized in that the magnetic head device is a multichannel magnetic head device with the soft-magnetic layers and a number of magnetoresistive elements forming a corresponding number of parallel flux paths in the first and the third direction, this number corresponding to the number of magnetic channels of the magnetic head device.

13. A thin-film magnetic read head device as claimed in claim 10, characterized in that the device further comprises at least one magnetoresistive element comprising at least one of said soft-magnetic layers and said exchange biasing layer, the exchange biasing between these layers at least being partly reduced locally to control the read width.

14. A thin-film magnetic read head device as claimed in claim 10, characterized in that there the device further comprises at least one magnetoresistive element which is magnetically coupled with or comprises the soft-magnetic layer which is locally coupled with the exchange biasing layer to control the read width.

15. A thin-film magnetic read head device as claimed in claim 14, characterized in that the magnetoresistive element is of an anisotropic (AMR), a giant (GMR) or a spin tunnel junction (STJ-MR) type.

16. A thin-film magnetic read head device as claimed in claim 14, characterized in that the soft-magnetic layer to which the magnetoresistive element is magnetically coupled is interrupted in the third direction, and in that the exchange coupling of a part of said interrupted soft-magnetic layer which is most near the end face and the exchange biasing layer is locally reduced to control the read width.

17. A thin-film magnetic read head device as claimed in claim 16, characterized in that an exchange biasing layer is provided between the magnetoresistive element and the soft-magnetic layer to which the magnetoresistive element is coupled, with the exchange biasing being decoupled in the contact region of the magnetoresistive element with the latter exchange biasing layer to control the flux-guiding to said magnetoresistive element.

18. A system for recording information, comprising a thin-film magnetic read head device as claimed in claim 10.

19. A system as claimed in claim 18, characterized in that the magnetic head device is a multichannel magnetic head device with the soft-magnetic layers and a number of magnetoresistive elements forming a corresponding number of parallel flux paths in the first and the third direction, this number corresponding to the number of magnetic channels of the magnetic head device.

* * * * *